United States Patent [19]

Harris

[11] Patent Number: 4,914,823
[45] Date of Patent: Apr. 10, 1990

[54] FLOAT BIASED LEVEL APPARATUS

[76] Inventor: Kenneth W. Harris, 4830 Allegheny, San Antonio, Tex. 78229

[21] Appl. No.: 340,069

[22] Filed: Apr. 18, 1989

Related U.S. Application Data

[62] Division of Ser. No. 60,453, Jun. 11, 1987, Pat. No. 4,843,725.

[51] Int. Cl.⁴ ................................................ G01C 9/12
[52] U.S. Cl. ........................................ 33/378; 33/396
[58] Field of Search ................... 33/391, 396, 398, 378

[56] References Cited

U.S. PATENT DOCUMENTS 2,939,221  6/1960  Pickett ................................. 33/396
4,096,638  6/1978  Schimming ......................... 33/396

FOREIGN PATENT DOCUMENTS 1410929  8/1965  France ................................. 33/378
0977957  11/1982  U.S.S.R. ............................. 33/396

Primary Examiner—Harry N. Haroian
Attorney, Agent, or Firm—Cox & Smith Incorporated

[57] ABSTRACT

A level for determining whether a surface is horizontal and which can also be used to determine the angular relationship between the surface or a line on the surface and the horizontal. The level utilizes a rotating pendulum designed with a pointer that indicates a direction representing the vertical. The pointer (or vertical indicator) is biased in this position by a weight (or alternatively a float) and it points to scale markings that calibrate the position of the rotating pendulum to correspondingly represents the angular deviation of the surface from the horizontal. The weight and the pointer are attached by a set screw which allows the weight to be pivoted with respect to the pointer so that the center of gravity of the rotating pendulum as a whole can be altered and the direction in which the pointer points can be adjusted for accuracy.

4 Claims, 2 Drawing Sheets

U.S. Patent    Apr. 10, 1990    Sheet 2 of 2    4,914,823
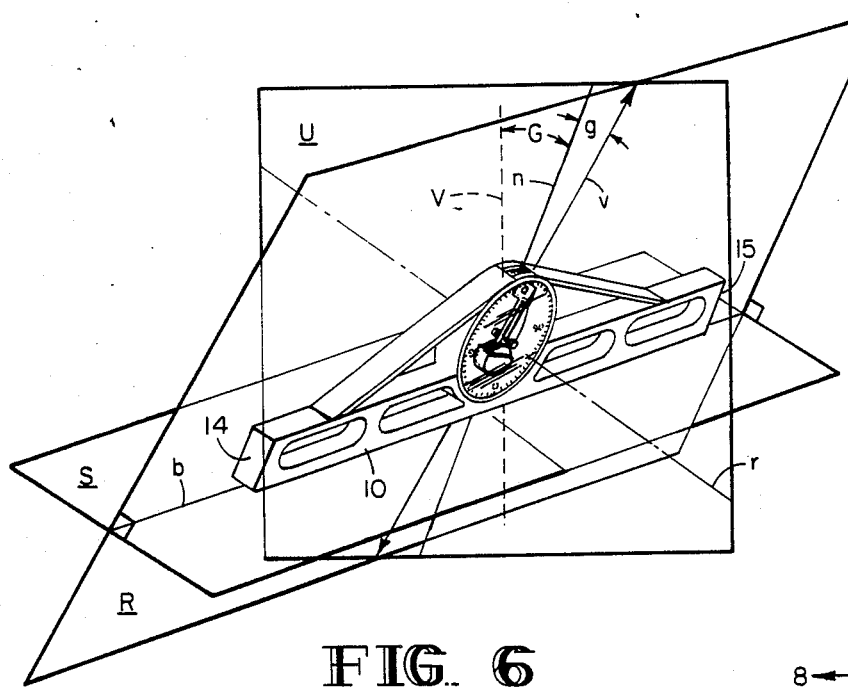
FIG. 6
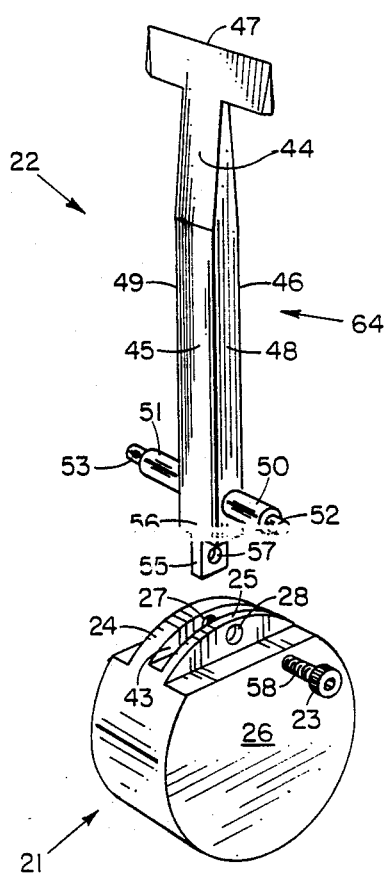
FIG. 5
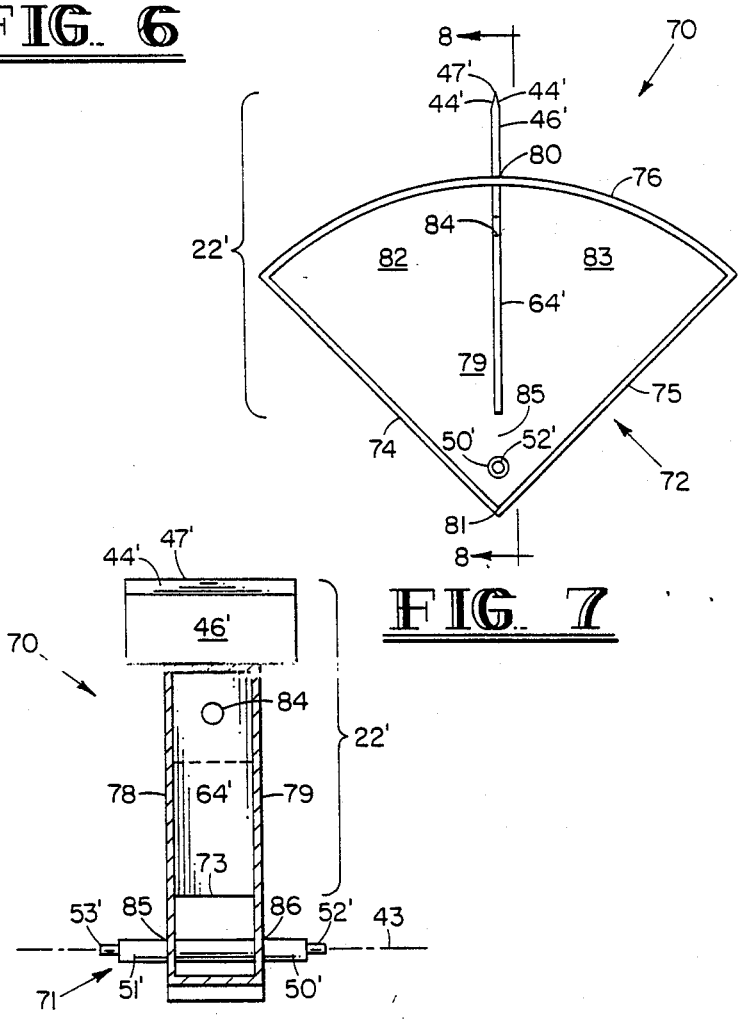
FIG. 7
FIG. 8

FLOAT BIASED LEVEL APPARATUS

This application is a division of application Ser. No. 07/060,453 filed 6/11/87 now U.S. Pat. No. 4,843,725.

BACKGROUND OF THE INVENTION

The present invention relates generally to a level for determining an angular relationship between a line of interest, typically on a surface, and the horizontal. More particularly, the present invention relates to a level utilizing a weight, and alternatively a buoy, to bias an indicator in a position that represents the vertical, which position is calibrated relative to a housing for enabling determination of angular deviations of the line with respect to a horizontal plane.

Levels are used extensively in a variety of fields, particularly many related to construction. They enable an ascertainment of whether a line or a planar surface is horizontal when the apparatus is positioned on the line or surface. To determine whether a surface is horizontal, the angular deviations of lines on that surface are determined and appropriately combined using trigonometric calculations to determine a representation of the angular deviations of the plane of the surface from the horizontal. Levels typically have a longitudinal dimension which is positioned in operation to linearly correspond with the line of interest.

Perhaps the most common of previous levels has been the bubble level, also known as the "spirit level". This type of level consists essentially of an encased, liquid-filled tube containing an air bubble that moves to a center window when the instrument is set on a horizontal line. Their use is generally limited to determining whether a line is approximately close (within a small margin of error) to the horizontal. Such bubble levels are simple, generally accurate, and inexpensive; however, their accuracy is subject to error, and their use to determine the precise angular deviation from the horizontal is difficult, usually requiring triangulation to do so. Because of the shape of a bubble, the position of the bubble must be determined by the position of its perimeters which are curved lines. This determination is typically achieved by comparing the alignment of the longitudinal edges of the bubble with lines marked or etched on the window of the bubble level. When the bubble level is on an ideally horizontal surface, the line or lines that indicate a horizontal position should be tangential with the perimeter of the bubble. This tangential alignment, itself, allows room for some error, especially when considering the difficulties in viewing the edge of a bubble due to capillary effects between the liquid and the window. Even slight capillary effects cause the perimeters of the bubble to appear larger in width, and accuracy is diminished accordingly.

Furthermore, other errors may be encountered with bubble levels since a bubble level is typically calibrated with two linear markings which, when the level is on a horizontal surface, are each tangential to the bubble. While the distance between the two markings is constant, the size of the bubble must remain constant as well in order to avoid approximation. Practically, the precise volume of gas, as well as the shape of the bubble, must be maintained as constant. Each of these constants, however, are effected by several factors; for instance, an increase in temperature not only alters the shape of the bubble by increasing the pressure therein, but also increases the solubility of the gas within the liquid, tending to cause a decrease in the volume of the gas in the bubble. Thus, factors including temperature changes may add to errors in the use of bubble levels.

On the other hand, some apparatuses do not require bubbles to indicate the vertical, but rather utilize weights to determine a plumb and, thus, eliminate the problems associated with bubble levels. A common example of such an apparatus is the pendulum, which may be utilized for defining a plumb (a line perpendicular to the horizontal plane). Employment of such pendulums to determine whether the surface is horizontal, however, presents difficulties to one who is using the pendulum. This is particularly true when the pendulum is made in a compact size since the individual reading the pendulum is often positioned above the line of interest and looking down upon the pendulum from above. While the movement of the pendulum is at its lower end, an end which typically comprises a large, bulky mass, a user of a pendulum as a level encounters difficulties in reading the pendulum from above.

A rigid pendulum having an indicator propending diametrically opposite the pendulum's point of suspension would eliminate the previously mentioned problems of bubble levels while also providing an accurate indicator which can be gauged at the upper portion of the pendulum. This guaging at the upper portion enables the reading of the pendulum from above. Such devices are termed weight-biased levels for the purposes of this discussion. They have a single, rigid pendulum, rotating about a central axis with a weight to bias its indicator in the vertical direction; however, while such pendulums have been typically formed by casting or machining, it has been extremely costly and difficult to produce such a rigid rotating pendulum which is perfectly symmetrical. Such perfect symmetry is necessary in order to propend the vertical indicator in a position which represents the true vertical position. This impossibility is primarily due to the inevitable fluctuations in density of the materials used to produce such pendulums, including common fluctuations caused by voids and other inclusions in the material.

As a result, the production of accurate weight-biased levels has been inhibited by the necessity to machine away portions of the weight from one symmetrical side to the other, in an itterative fashion, until the pendulum indicates a representation of the true vertical position. Such itterative machining is costly, time consuming and still has accuracy limits depending on the machining instruments.

Thus, it is an object of the present invention to provide a weight-biased level apparatus which includes means for enabling the indication of a component representing the true vertical direction and which does not require machining in order to balance the rotating pendulum.

Furthermore, while such rotating pendulums must be suspended about virtually frictionless bearings in order to eliminate error in indicating the vertical, weight-biased levels tend to rotate about their rotational axis back and forth, in an oscillatory manner, for substantial period of time before finally coming to a rest. Thus, it is another object of the present invention to provide a weight-biased level apparatus which is highly accurate and which comes to rest indicating the vertical in as short a time as possible.

Accordingly, it can be seen by one of ordinary skill in the art, in light of the foregoing and subsequent discussions, that there is a need to overcome these and other problems relating to level apparatuses. It is also toward such objectives that the present invention is directed.

SUMMARY OF THE PRESENT INVENTION

The present invention is embodied by a gravity-biased level having a weight and an indicator rotating about a rotational axis, which indicator is biased by said weight to indicate a reference direction which is representative of the vertical. This direction indicator points to markings on a scale for determining whether or not the surface on which the level is set is horizontal, and further for determining angular deviation of the surface's disposition relative to the horizontal. Alternatively, the weight is substituted by a buoy suspended in a liquid for biasing the direction indicator.

The accuracy of the embodiments of the present invention is much higher than with previous levels, partially because the present invention incorporates rigid means which are not susceptible to the inaccuracies of bubbles. The direction indicator has a precise edge that is oriented parallel to the rotational axis for enabling accuracy. The precise edge as viewed from the side appears as a point which can be precisely lined up with scale markings on a housing for the apparatus. Viewed from above, a precise determination of the indicated direction can be made by looking to see which of the scale markings aligns in the plane common between the precise edge and the rotational axis.

While the weight and the direction indicator are connected to form a gravity biased direction indicator, the present invention uniquely incorporates a means for balancing this gravity-biased direction indicator to indicate a vertical component which accurately represents the true vertical direction. The balancing means of the present invention functions in a manner which is more accurate, achieved with less difficulty and, accordingly, at less expense with respect to previous apparatuses, such as those which required machining in order to balance.

This balancing means is enabled by combining two independent, rigid parts to form the gravity-biased direction indicator. These two independent parts are the direction indicator and the weight which are rigidly joined in a fixed relationship by a set screw. As the vertical indicator is pivoted with respect to the weight about the axis of the set screw, the balance (i.e. the location of the center of gravity relative to the rotational axis) of the gravity-biased direction indicator about the rotational axis is adjusted as well. Such adjustment may be performed during manufacturing of the weight-biased level in order to calibrate the weight-biased level indicator in a true vertical position.

Additionally, the weight incorporates means which include flanges for securing the set screw so that it will remain in a permanent position once it is set. The flanges have elastic properties which tend to oppose the tightening of the set screw. When the set screw is fully tightened, an axial force is imposed on the set screw. This axial force increases the frictional force between the threads of the set screw and their connection with the flanges. The flanges, functioning similar to a lock washer, accordingly prevent the set screw's gradual loosening which could otherwise destroy the accuracy of the apparatus in time.

The rotating pendulum is suspended by ball bearings within a circularly cylindrical housing, rotating about the axis of the circularly cylindrical housing with the vertical indicator pointing to markings on the circularly cylindrical housing. As the housing is made of a transparent material, the markings enable an operator to view and determine the angular deviation of the direction indicator from the reference vertical. Further, the markings are readily visible from a variety of perspectives, and the invention may also include a magnifying means which increases its accuracy even more. A supporting structure supports the circularly cylindrical housing such that the housing is fixed relative to the supporting structure. While the supporting structure has a planar surface with a longitudinal direction for resting on a line on a surface, the apparatus contains a combination of means which enable determination of the angular disposition of the line and the surface relative to the reference vertical direction.

Furthermore, the rotating pendulum of the present invention is suspended in a viscous fluid, such as mineral oil, in order to dampen the oscillatory motion of the pendulum. Such damping enables the practical advantage of indicating the vertical component in as short a time as is possible. The pendulum housing contains the viscous fluid along with the rotating pendulum and its bearings.

In an alternative embodiment, the weighted rotating pendulum is substituted by a buoyed rotating indicator which floats in the viscous fluid or another liquid. The buoyed rotating indicator functions much like the rotating pendulum, rotating about the axis of rotation to point in a direction that represents the vertical, which direction is angularly calibrated to enable the operation of the apparatus. Unlike the rotating pendulum though, the buoyed rotating indicator is not balanced by pivoting one part relative to another, but is balanced by adhering small pieces of material to the buoyed rotating indicator on its appropriate sides.

Thus, any of the mentioned embodiments of the present invention can operatively indicate a direction representing the vertical (or another reference direction relative to the vertical). An embodiment may compare the indicated direction with a line perpendicular to a surface on which the embodiment rests. While this comparison is calibrated by scales on the apparatus, one can determine not only whether a surface is level, but also can determine an angular representation of the cant of the surface if the surface is not level.

Many other objects, features and advantages will become obvious to one of ordinary skill in the art in light of the following detailed description taken in conjunction with the appended figures and claims, and it is intended that these are within the scope of the invention as well.

BRIEF DESCRIPTION OF THE DRAWINGS

FIG. 5 is an exploded perspective view of the rotating pendulum of the present invention.

FIG. 6 is an isometric view showing a typical employment of the apparatus of the present invention with respect to a line of interest on a plane of interest and also showing the relative orientation of various lines and planes of reference.

FIG. 7 is a front elevation view showing the buoyed, rotating vertical indicator of an alternative embodiment of the present invention.

FIG. 8 is a side cross-sectional view taken along line 8—8 of FIG. 7, showing the buoyed, rotating vertical indicator of an alternative embodiment of the present invention.

DETAILED DESCRIPTION OF THE PREFERRED EMBODIMENT

Referring first to FIG. 6, the apparatus of the present invention is shown in a typical operative position with respect to a line of interest b on a planar surface of interest S. References to line of interest b and plane of interest S are made for orientation purposes throughout this description. Base 10 has a longitudinal dimension L (shown in FIG. 2) which is positioned parallel with line of interest b. Plane R is perpendicular to the surface of interest S and includes line of interest b. Rotating pendulum 20 rotates within plane R and plane R is thus termed "plane of rotation" R. Rotating pendulum 20 rotates about axis r, which rotational axis r is perpendicular to plane R. The vertical component v referred to in this description is a reference vector which is in plane R. Plane U is a vertically oriented plane, perpendicular to plane of rotation R and including rotational axis r.

Further, the vertical component v is a vector originating at the intersection between rotational axis r and the rotational plane R. Vertical component v has a generally upward direction and is colinear with a line representing the intersection between plane R and vertical plane U. Normal line n is within plane of rotation R and is perpendicular to planar surface S, intersecting with axis of rotation r. True vertical line V lies truly vertical and intersects with rotational axis r. Cant angle g is the acute angle formed by vertical component v and normal line n within rotational plane R. Tilt angle G is the acute angle formed by vertical component v and true vertical line V within vertical plane U.

Figure 1:
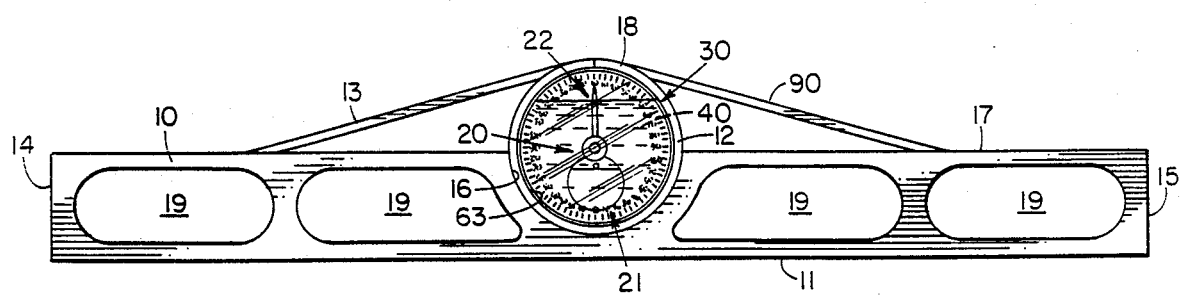
FIG. 1 is a front elevation view of the apparatus of the present invention.

Referring now to FIG. 1, the apparatus of the present invention is shown positioned on surface of interest S with surface of interest S being a planar surface perpendicular to the plane of FIG. 1. A support structure 9 supports the apparatus of the present invention. The support structure 9 comprises base 10, struts 13 and circular frame 12. Base 10 has a shape similar to a rectangular prism, having rectangular longitudinal ends 14 and 15, a bottom planar surface 11 and upper surface 17. Planar surface 11 is planar and is operatively positioned parallel to and resting on surface of interest S. Base 10 has structural cavities 19 which are oval shaped through-cavities through the depth D (shown in FIG. 2) of base 10. Base 10 also has an arced intrusion 16 at its longitudinal center. Circular frame 12 has an annularly cylindrical shape with a cylindrical axis 43 positioned perpendicularly to the plane of FIG. 1. Circular frame 12 defines a circular socket 63 and 91 within which housing 30 fits. Circular frame 12 fits within the space formed by the arced intrusion 16. Circular frame 12 is rigidly connected to base 10 along the arc of the arced intrusion 16. Struts 13 and 90 are each rigidly connected between the upper surface 17 of base 10 and the upper portion 18 of circular frame 12. Support structure 9, thus, is a rigid, composite structure for supporting the apparatus of the present invention and, particularly, for supporting rotating pendulum 20, rotating pendulum housing 30 as well as damping fluid 40 contained within the rotating pendulum housing 30.

Figure 3:
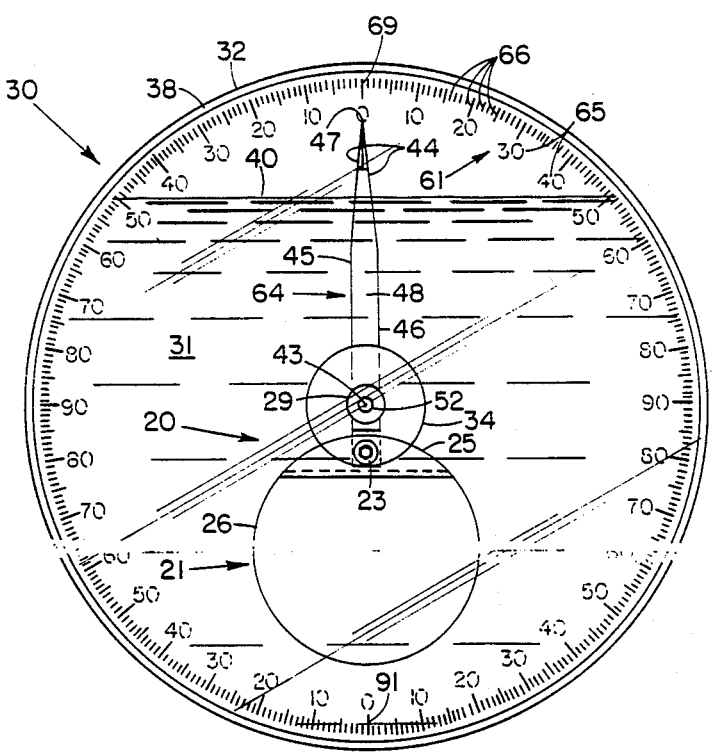
FIG. 3 is a front elevation view showing the rotating pendulum in a position within the rotating pendulum housing of the present invention, which shown position represents that corresponding to a horizontal line of interest.

Referring now to FIG. 3, rotating pendulum 20 is shown operatively disposed within rotating pendulum housing 30. Rotating pendulum housing 30 comprises a front face 31 and a rear face 35 (shown cross-sectionally in FIG. 4), an annularly cylindrical portion 32, and washer-shaped bearing supports 33 and 34 (shown cross-sectionally in FIG. 4). Each of the parts 31 through 34 of rotating pendulum housing 30 are rigidly and sealingly connected to one another of parts 31 through 34 forming a rigid, composite rotating pendulum housing 30. This rigid, composite rotating pendulum housing 30 fully enclosed pendulum space 39. Pendulum space 39 is completely sealed in a manner that prevents the escape of fluids from within pendulum space 39. Pendulum space 39 is adjacent the inner surface 59 of annularly cylindrical portion 32 and is also adjacent the inner sides (not numbered) of faces 31 and 35. Rotating pendulum 20, bearings 29, and damping liquid 40 are within pendulum space 39.

Figure 4:
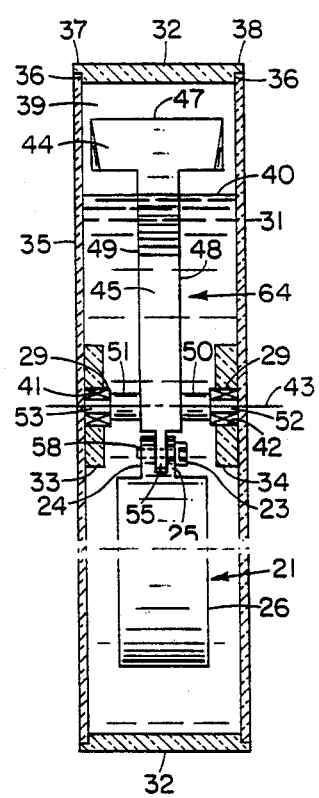
FIG. 4 is a partial cross-sectional view taken along line 4—4 of FIG. 3.

Referring now to FIG. 4, rotating pendulum housing 30 is shown cross-sectionally. Annularly cylindrical portion 32 has countersinks 36 over the extent of the inner circumference at each axial end 37 and 38 of annularly cylindrical portion 32. Front face 31 and rear face 35 are circular plates which are identical with respect to each other of faces 31 and 35. The circular shape of faces 31 and 35 has a diameter that enables each of faces 31 and 35 to fit snugly and sealingly at the axial ends 37 and 38 within countersinks 36 of annularly cylindrical portion 32. Washer-shaped bearing supports 33 and 34 are rigidly connected to faces 31 and 35, respectively. Washer-shaped bearing supports 33 and 34 are circular plates having holes 41 and 42 through their circular centers. Washer-shaped bearing supports 33 and 34 are identical with respect to each other of supports 33 and 34. Faces 31 and 35 and washer-shaped bearing supports 33 and 34 each have respective central axes through their circular center and perpendicular to their respective planar shapes. Faces 31 and 35 and washer-shaped bearing supports 33 and 34 are each positioned coaxially with respect to each of the others of faces 31 and 35 and washer-shaped bearing supports 33 and 34, about a common central axis 43. Washer-shaped bearing supports 33 and 34 are rigidly connected to the inner sides of faces 31 and 35, which inner sides are adjacent to pendulum space 39. Holes 41 and 42, thus, form sockets 41 and 42 for receiving and supporting the end of a shaft and bearings.

Referring now to FIG. 5, the rotating pendulum 20 of the present invention is shown in exploded view. The rotating pendulum 20 comprises weight 21 and vertical indicator 22. Rotating pendulum 20 also comprises set screw 23 for rigidly connecting weight 21 to vertical indicator 22. Weight 21 is generally cylindrical in shape, having particular modifications including flanges 24 and 25. Flanges 24 and 25 form part of the cylindrical shape of weight 21. Thus, weight 21 with flanges 24 and 25 can be easily produced by machining a solid metallic cylinder in a manner that produces the shape of weight 21. Flanges 24 and 25 are radial protrusions from the cylindrical axis of the shape of weight 21, protruding from the bulk 26 of weight 21. Flanges 24 and 25 each have through bores 27 and 28 which are respectively coaxial about an axis which is parallel to the axis of the cylindrical shape of weight 21. A socket 43 is formed between first flange 24 and second flange 25. First flange 24 has a thicker dimension along through bore 27 than the dimension of flange 25 along through bore 28. The material which composes weight 21 has elastic properties, enabling flanges 24 and 25 to be flexible, particularly in directions parallel to the cylindrical axis of the shape of weight 21. Due to the thicker dimension of flange 24, flange 25 is more flexible than flange 25. Through bore 27 is slightly smaller in diameter than through bore 28.

Vertical indicator 22 is approximately "T"-shaped ("T"-shape visible in FIG. 4). The trunk 64 if indicator 22 in substantial part has the shape of a rectangular prism with planar sides 45, 46, 48 and 49. Sides 45 and 46 are opposite each other of sides 45 and 46. Sides 48 and 49 are opposite each other of sides 48 and 49. The upper end 44 of vertical indicator 22 is beveled on each of opposite sides 45 and 46. The bevels formed on each of opposite sides 45 and 46 converge, drawing to a precise edge 47 at the uppermost extremity of vertical indicator 22. Precise edge 47 is linear and is perpendicular to the plane of FIG. 3, and, thus, appears as a point in FIG. 3. Referring again to FIG. 5, vertical indicator 22 has cylindrical shafts 50 and 51 protruding from the opposite sides 48 and 49, respectively. Shafts 50 and 51 are each rigidly connected to the trunk 64 of vertical indicator 22. Protruding shafts 50 and 51 are respectively coaxial about the rotational axis 43 of rotating pendulum 22. The rotational axis 43 is perpendicular to each of sides 48 and 49, and rotational axis 43 is also the common central axis 43 of rotating pendulum housing 30. Protruding shafts 50 and 51 are integrally formed with vertical indicator 22. Protruding shafts 50 and 51 have cylindrical journals 52 and 53 of reduced diameter at the outer ends of shafts 50 and 51, respectively.

Vertical indicator 22 also has tab 55 protruding downwardly at the lower end of vertical indicator 22. Tab 55 is rigidly connected to the lower end of the trunk of vertical indicator 22. Tab 55 has a cylindrical through bore 57 having a cylindrical axis parallel to rotational axis 43. Tab 55 fits within socket 43. Through bore 57 is positioned coaxially with through bore 27. Set screw 23 is a metal screw which is self-threading when screwed through a bore having an appropriately small diameter. Set screw 23 has self-threading threads 58 of a diameter that do not thread into bores 28 and 57 when screwed through bores 28 and 57; however, the self-threading threads 58 of set screw 23 have a diameter which enables threading through bore 27 for rigidly securing set screw 23 to first flange 24 when set screw 23 is screwed through bore 27. Set screw 23 is positioned with its threads 58 through bores 27, 28, and 57. Set screw 23 is tightened by screwing set screw 23 through bore 27. Set screw 23 is fully tightened by screwing set screw 23 through bore 27 until vertical indicator 22 is immovable with respect to weight 21. When set screw 23 is in place but not fully tightened, tab 55 and flanges 24 and 25 form a hinge about set screw 23, and weight 21 is thus pivotable about set screw 23 with respect to vertical indicator 22. There is also a very small clearance (not shown) between flanges 24 and 25 and tab 55 when set screw 23 is not fully tightened.

However, when set screw 23 is fully tightened, weight 21 is immovably secured to vertical indicator 22. Flange 25, being thinner and thus more flexible than flange 24, flexes towards flange 24 as set screw 23 is tightened, thus decreasing the clearance between flanges 24 and 25 and tab 55. When set screw 23 is fully tightened, the clearance between tab 55 and flanges 24 and 25 is completely eliminated, and set screw 23 enables a rigid bond between weight 21 and vertical indicator 22. Flange 25, furthermore, functions like a lockwasher, preventing the uncrewing of set screw 23. The flexed position of flange 25 imposes an axial force on set screw 23, thus maintaining a frictional force between the threads 58 and the self-threaded threads of bore 27. Thus, set screw 23 will not unscrew from the fully tightened position without a substantial unscrewing force.

Standardly available ball bearing units 29 are roughly cylindrical in shape, each having a cylindrical housing and a socket for receiving a journal through their cylindrical axis. The sockets are rotatable with respect to the housing of the units 29, and ball bearings are disposed between the socket and the housing of each unit 29 for reducing the rotating friction between each socket and each respective housing. Ball bearing units 29 fit snugly within sockets 41 and 42. Each of journals 52 and 53 fit snugly in respective sockets of ball bearing units 29. When rotating pendulum 20 is rotatably mounted within rotating pendulum housing 30 at the common central axis 43, there is a small clearance 60 between precise edge 47 and the inner surface 59 of annularly cylindrical portion 32.

Referring now to FIG. 3, each of members 31 through 35 of rotating pendulum housing 30 are composed of a transparent material having numerous scale markings 61 and 62 (shown in FIG. 2) thereon. Front face 31 and rear face 35 are identical. Faces 31 and 35 have scale markings 61 around their circumference marking degrees between zero and 90, with zero markings 63 and 91 respectively positioned near diametrically opposite edges of each of faces 31 and 35. The scale markings 61 are positioned to enable representation of acute angular measurements of angular deviation from the zero markings 63 and 91 about common central axis 43. The scale markings 61 include both numeral markings 65 and tick markings 66. The numeral markings 65 are arabic numerals marked on each of faces 31 and 35 representing angular deviations at ten degree intervals between zero and 90. Tick markings 66 represent angular deviations at one degree intervals from zero markings 63 and 91. Tick markings 66 are positioned around the circumferences of faces 31 and 35. Zero markings 63 and 91 are termed the upper zero markings and zero markings 91 are the lower zero markings despite the possible operative positioning of lower zero markings 91 above zero markings 63 and 91 such as when planar surface 11 is placed on the underside of a surface of interest S (referring to FIG. 6).

Figure 2:
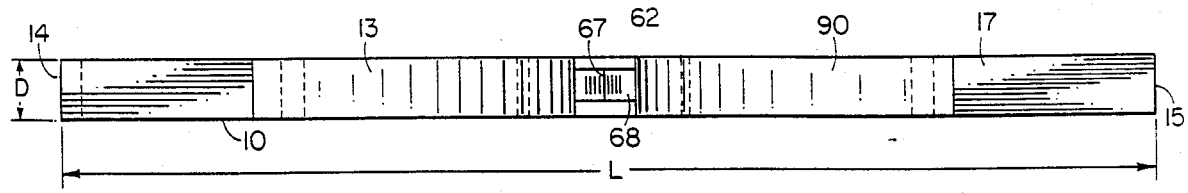
FIG. 2 is a plane view of the apparatus of the present invention.

Referring briefly to FIG. 2, scale markings 62 are similarly markings which represent angular deviations away from a zero marking 67. Scale markings 62 are elongated tick markings aligned parallel to common central axis 43 (shown in FIG. 4) and represent angular deviations at one quarter (¼) degree intervals between zero and five degrees from zero marking 67. As may be described more fully in subsequent paragraphs, zero markings 63, 91 and 67 are oriented such that there is a plane (not shown) common to each of zero markings 63, 91 and 67. With respect to support structure 9, this plane common to each of zero markings 63, 91 and 67 includes line n. Zero markings 63, 91 and 67, thus, function as a reference for normal line n (shown in FIG. 6)

when the apparatus of the present invention is being properly utilized.

Window space 68 (shown in FIG. 2) is a roughly rectangular space cut out from the upper portion 18 of circular frame 12. Window space 68 is fashioned to enable operative viewing of scale markings 62 by an individual utilizing the apparatus of the present invention. The transparent insert (not shown) fits snugly within window space 68 and is secured to circular frame 12 around the perimeters of window space 68. This transparent insert is rectangular and includes a centrally oriented magnifying lens. The magnifying lens is integrally formed with the transparent insert for magnifying the view of scale markings 62 through window 68.

The scale markings 61 and 62 are employed for representing the angular position of precise edge 47 of vertical indicator 22 with respect to rotating pendulum housing 30. When viewed through window 68, looking toward rotation axis 43 in a view approximately similar to the plan view shown in FIG. 2, the angular deviation of the rotating pendulum 20 with respect to rotating pendulum housing 30 may be determined if the deviation is between zero and five degrees from zero marking 167. In such situation, the angular deviation is determined by resolving which specific tick marking of scale markings 62 aligns with precise edge 47 (shown in FIG. 5). Scale markings 62 are marked on annularly cylindrical portion 32 in a fashion that enables this determination when viewing through window 68.

Note that, for reference using scale markings 62, there is only one zero marking 67 rather than the two diametrically opposite zero markings 63 and 91 on each face 31 and 35 as with scale markings 61. Additionally, scale markings 62 only measure a five degree variance between zero marking 67 and the position of precise edge 47. These characteristics, along with the magnifying lens of the transparent insert in window 68, particularly enable the use of scale markings 62 to determine very small angular deviations. Scale markings 62 are, thus, ideal for determining whether line n, normal to a surface of interest S, is precisely vertical (i.e. whether surface S is precisely horizontal), and they are also ideal for determining the minute angular deviations from the vertical if not precisely so oriented. Since markings 62 are near upper portion 18, in order to effectively use scale markings 62 to determine the cant angle g, the apparatus of the present invention can only be deployed on the top surface of a surface of interest S.

On the other hand, scale markings 62 enable determination of cant angle g regardless of the magnitude of the angular deviation and regardless of whether the apparatus of the present invention is resting on the top surface of surface of interest S.

Scale markings 61 are positioned about the circumference of faces 31 and 35 such that a linear projection (not shown) of precise edge 47 intersects with faces 31 and 35 along an arc that is calibrated in an ordinarily progressive fashion by scale markings 61, which arc corresponds to the full rotational range of rotating pendulum 20. When viewed in operation in a view similar to the elevation view shown in FIG. 1, the angular deviation of rotating pendulum 20 with respect to the zero markings of rotating pendulum housing 30 may be determined by aligning the appropriate tick mark 66 with precise edge 47 while precise edge 47 appears as a point.

Faces 31 and 35 are positioned with respect to annularly cylindrical portion 32 such that, for any and all specific orientations of precise edge 47 within zero and five degrees from the upper zero markings 63 and 91, scale marking 61 and 62 indicate precisely the same angular deviation of precise edge 47 from the respective zero markings 63, 91 and 67. Faces 31 and 35 are respectively positioned for indicating with scale markings 61 precisely the same angular deviations of rotating pendulum 20 for any and all specific orientations of rotating pendulum 20.

The rotating pendulum housing 30 has an outer diameter, which outer diameter is the outer diameter of annularly cylindrical portion 32, that enables a snug fit of annularly cylindrical portion 32 within the socket 63 of circular frame 12. Rotating pendulum housing 30 is positioned within circular socket 63 and 91 and is rigidly bonded to circular frame 12 along the inside of socket 63 and 91. Rotating pendulum housing 30 is also positioned to enable rotating pendulum's 20 indication of a zero degree orientation when lower planar surface 11 is placed on a precisely horizontal plane.

During the assembly stages of the manufacturing of the apparatus of the present invention, referring to FIG. 5, set screw 23, as it interrelates with other parts of rotating pendulum 22, provides a means for adjusting the balance of rotating pendulum 22 about rotational axis 43. This balance adjusting means further enables calibration of the apparatus of the present invention for indicating precisely zero degrees when planar surface 11 is resting on a precisely horizontal plane. More specifically, during manufacturing rotating pendulum 20 is positioned on a support similar to the rotating pendulum housing 30 of the present invention, and the balance of rotating pendulum 20 is adjusted by pivoting weight 21 about set screw 23 for enabling precisely vertical indication by vertical indicator 22. Set screw 23 is positioned through bores 27, 28 and 57 during this calibrating adjustment; however, set screw 23 is fully tightened only after the desired balance has been achieved. While weight 21 biases the precise edge 47 of vertical indicator 22 in an upward position, adjusting the position of weight 21 with respect to vertical indicator 22 alters the location of the center of gravity of rotating pendulum 20, and the direction which vertical indicator 22 indicates is accordingly adjusted. In essence, by pivoting weight 21 about set screw 23, the indication of precise edge 47 with respect to a vertical component through the rotational axis r is adjusted. Performing this adjustment in an itterative fashion, decreasing the magnitude of the pivotal adjustments with successive adjustments as the indication of precise edge 47 approaches an indication of a precisely vertical component v, enables precise calibration of rotating pendulum 20 (within a predetermined margin of error) to indicate the direction of a vertical component b (shown in FOG. 6). This calibration may be performed manually or using sophisticated machinery (not shown) designed to do so. Thus, rotating pendulum 20 is calibrated during the manufacturing stages to precisely indicate vertical component v, which vertical component v is indicatively represented by a vector running from rotational axis 43 of rotating pendulum 20 through precise edge 47 in the rotational plane R.

Furthermore, while precise edge 47 provides a precise indication of this vertical component v, and while the apparatus of the present invention is also provided with means, for accurately determining the direction of precise indication relative to normal line n, several margins of error associated with the apparatus of the present invention are virtually eliminated. The means for accurately determining the direction of precise indication relative to normal line n particularly includes markings 61 and 62 as well as the magnifying lens in window 68. Error in determining the angular deviation of rotating pendulum 20 with respect to zero markings 63, 91 and 67 is, thus, inexpensively and effectively reduced to virtual elimination.

Utilization of the apparatus of the present invention, referring to FIG. 6, enables determination of cant angle g corresponding to a line of interest b, typically on a surface S. Cant angle g represents the angular deviation of a line n (normal to the line of interest b) from the vertical component v. This angular deviation represented by cant angle g can be correlated to the angular relationship between surface S or line of interest b with respect to a horizontal plane (not shown) using trigonometric analysis. The angular deviation determined by correlating scale markings 61 and 62 with precise edge 47 represents this cant angle g.

Unfortunately, tilt angle G does have a bearing on the measure of cant angle g except when line of interest b is exactly horizontal or exactly vertical, in which cases cant angle g is always zero or ninety degrees respectively. For this reason, cant angle g determination should usually be made for two different non-parallel lines of interest b on each planar surface of interest S in order to obtain a complete representation of the plant's S slope. This also presents a placement consideration when determining the cant angle of a line (as opposed to a surface) since plane of interest S is often indefinite if not non-existent.

Thus, when employing the apparatus of the present invention to measure the cant angle of a line of interest b which is independent from a plane of interest S, one should assume a surface of interest S, which assumed surface of interest S is ideally one which sets tilt angle G at zero degrees. This assumption enables direct measurement of a single cant angle g that completely characterizes the slope of line of interest b. Quite similarly, a simplified slope measurement may be accomplished even with a line of interest on a surface of interest S by tilting base 10 about line of interest b until tilt angle G is equal to zero and then measuring cant angle g. The tilting of base 10 to reduce tilt angle G to zero degrees, fortunately, does not have to be critically accurate in order to still get precise measurement of a cant angle g that completely represents the slope of line of interest b. This is because cant angle g is only negligibly affected by tilt angle G when tilt angle G is less than about five degrees.

An employer of the apparatus of the present invention places base 10 longitudinally parallel to line of interest b, with planar surface 11 resting on surface of interest S (when appropriate) and on line of interest b. Rotating pendulum 20 automatically rotates bout rotational axis 43 with weight 21 biasing precise edge 47 to indicate vertical component v. The overall shape of vertical indicator 22 enables ready visibility of the vertical component v, and scale markings 61 and 62 enable precise determination of cant angle g corresponding to line of interest b.

Other practical advantages are also provided by the apparatus of the present invention. Damping liquid 40, which liquid 40 is a mineral oil, provides a viscous force against the rotation of rotating pendulum 20 about rotational axis 43. Damping liquid 40 substantially fills the space that is not occupied by rotating pendulum 20 within pendulum space 30. It 40 has viscous properties and is of a quantity for enabling weight 21 to quickly bias vertical indicator 22 in a precisely vertical orientation while minimizing the oscillatory swinging of weight 21 beneath rotational axis 43 before reaching this precisely vertical indication by vertical indicator 22.

An alternative embodiment of the present invention, referring to FIGS. 7 and 8, utilizes a buoyed rotating indicator 70 in place of rotating pendulum 20 of the previously described embodiment of the present invention. The buoyed rotating indicator 70 biases precise edge 47' in a vertical direction. Buoyed rotating indicator 70 is employed with all of the components of the previously described components of the apparatus of the present invention except for rotating pendulum 20. Thus, references to previously described and identical components are made using the same reference numerals as previously used. Other characteristics of buoyed rotating indicator 70 are similar and serve the same function as aspects of rotating pendulum 20; therefore, these similar aspects are referred to in the discussion of buoyed rotating indicator 70 using similar terminology and similar reference numerals except that the reference numerals relating to buoyed rotating indicator 70 are accompanied by a prime indication (the prime indication being " ' ").

Buoyed rotating indicator 70 is symmetrical about a central plane (not shown), which central plane includes precise edge 47' and rotational axis 43, and which central plane is also parallel to the plane of FIG. 8. The buoyed rotating indicator 70 is comprised basically of enclosure 72, vertical indicator 22', and shaft 71. Vertical indicator 22' is "T"-shaped ("T"-shape shown in FIG. 8). Vertical indicator 22' is a single planar section having opposite planar sides 45' and 46'. Planar sides 45' and 46' each have a bevel 44' at their uppermost end, which bevels 44' converge forming a precise edge 47'.

Enclosure 72 is formed by sections 74 through 78 which are integrated together. Enclosure 72 sealingly encloses enclosed space 79. Sections 74 through 78 are composed of lightweight, transparent material and are each rigidly and sealingly bonded to the adjacent others of sections 74 through 78. Section 76 is sealingly connected around slot 80 to vertical indicator 22'. Sections 77 and 78 ar each sealingly connected to shaft 71 around holes 86 and 85 respectively. Enclosed space 79 contains air and the rigid and sealing integration of enclosure 72 prevents the escape of the air from within enclosed space 79. Sections 74 and 75 are rectangular sections which meet and are sealingly joined at line of joinder 81. Sections 77 and 78 are planar sections shaped like quadrants of a circle. Section 76 is an arced section, forming an arc about the line of joinder 81.

Enclosed space 79 further comprises spaces 82 and 83. Spaces 82 and 83 are in communication with each other of spaces 82 and 83 through hole 84 as well as through gap 85. Vertical indicator 22' has hole 84 through the upper portion of the trunk 64' of vertical indicator 22'. Shaft 71 is secured to sections 78 and 77 and is positioned through holes 85 and 86 respectively therethrough. Shaft 71 comprises protruding shafts 50' and 51', which protruding shafts protrude from enclosure 72 at holes 86 and 85, respectively. Protruding shafts 50' and 51' also have journals 52' and 53', respectively, of reduced diameter at their distal ends. Journals 52' and 53' fit snugly in the sockets of bearings 29 (shown in FIG. 4).

While buoyed rotating indicator 70 is symmetrical, precise edge 47' is biased to indicate vertical component v (shown in FIG. 6). This indication of vertical component v is enabled since precise edge 47' is within the central plane of symmetry (previously described) of buoyed rotating indicator 70. Imbalance of buoyed rotating indicator 70 which may result from imperfections practically encountered during manufacture of buoyed rotating indicator 70 are compensated during assembly of the apparatus of the present invention. This imbalance compensation is achieved by adhering differently sized portions (not shown) of material to the opposite (otherwise symmetrical) sides of enclosure 72. Adherence of such portions is systematically performed on the opposite sides in an itterative fashion until the buoyed indicator 70 indicates the true vertical while suspended in liquid 40 and rotating about a rotational axis 43 that is horizontal. Damping liquid 40 (shown in FIG. 3) is of an adequate quantity to enable the buoyancy of buoyed rotating indicator 70 so that vertical component v (shown in FIG. 6) is indicated by a precise edge 47'.

Additionally, should leakage of damping liquid 40 occur, partially filling enclosed space 79 with liquid, hole 84 provides means for ensuring the vertical indication of rotating buoyed indicator 70. As long as buoyed rotating indicator 70 has a sufficient buoyancy, air within enclosed space 79 freely flows through hole 84 in order to equalize the buoyancy between spaces 82 and 83. Note that without hole 84, a sufficient quantity of damping liquid within enclosed space 79 might cause errors since the equalization of the respective buoyancies of spaces 82 and 83 is disabled when liquid obstructs gap 85 by rising within enclosed space 79 above lower edge 73. Meanwhile, the full height of vertical indicator 22' including trunk 64', still enables readily visible indication of the direction of vertical component v.

Although the present invention has been described in conjunction with the foregoing specific embodiments, many other alternatives, variations and modifications are intended to fall within the spirit and scope of the appended claims.

I claim:

1. A level apparatus, comprising:
   an axial container having a central axis;
   an indicator including a rigid means and a float, rotatably mounted by means of a shaft within said container and movable throughout a 360° arc about said central axis, for indicating a direction; and
   a liquid contained within said container, which liquid has a certain average density; and
   said float being connected to said rigid means for utilizing the force of gravity to bias said rigid means coplanar with a vertical plane through said central axis, said float comprising a fluid-filled enclosure suspended in said liquid and having an average density less than the average density of said liquid for inducing an upward force, which upward force is operatively conveyed to said rigid means for biasing said rigid means co-planar with said vertical plane, said enclosure further comprising:
   first and second rectangular planar sections joined to one another along a line of joinder in the proximity of said central axis;
   an arcuate section joined at opposite ends to said first and second rectangular planar sections, said arcuate section having a concave surface facing each of said rectangular planar sections; and
   a first side section and a second side section sealingly joined with each of said first and second rectangular planar sections and said arcuate section to sealingly enclose a space for containing the fluid which fills said enclosure, said first side section being parallel with said second side section, and said shaft being connected to each of said first and second side sections coaxially with said container.

2. The apparatus of claim 1, wherein:
   said axial container has a circumference with angular graduations about said central axis marked thereon;
   said rigid means has a precise edge biased in said vertical plane adjacent said circumference, said rigid means comprising a centrally-diposed planar section positioned co-planar with both said central axis and said precise edge, said centrally-disposed planar section being connected at opposite edges to each of said side sections; and
   each of said side sections is transparent to enable viewing of said centrally-disposed planar section.

3. The apparatus of claim 2 wherein said centrally-disposed planar section subdivides said space into two chambers and said centrally-disposed planar section has a hole therethrough for equalizing the buoyancy between said chambers.

4. The apparatus of claim 1 further comprising an elongated base on which said container is mounted for positioning said apparatus on a surface of interest.

* * * * *